United States Patent
Hsu et al.

(10) Patent No.: US 7,127,521 B2
(45) Date of Patent: Oct. 24, 2006

(54) METHOD AND APPARATUS FOR REDUCING POWER CONSUMPTION IN NETWORK LINKING SYSTEM

(75) Inventors: Wiley Hsu, Hsin-Tien (TW); Vic Chen, Hsin-Tien (TW); Chin-Chang Li, Hsin-Tien (TW)

(73) Assignee: Via Technologies, Inc., Taipei (TW)

( * ) Notice: Subject to any disclaimer, the term of this patent is extended or adjusted under 35 U.S.C. 154(b) by 809 days.

(21) Appl. No.: 10/273,266

(22) Filed: Oct. 18, 2002

(65) Prior Publication Data

US 2003/0191854 A1 Oct. 9, 2003

(30) Foreign Application Priority Data

Apr. 3, 2002 (TW) ............................ 91106670 A

(51) Int. Cl.
*G06F 15/16* (2006.01)
(52) U.S. Cl. ............... 709/233; 713/320; 713/322
(58) Field of Classification Search ........... 709/233, 709/250, 249; 713/320, 322; 329/267; 327/115; 370/229, 232, 252
See application file for complete search history.

(56) References Cited

U.S. PATENT DOCUMENTS 5,633,859 A * 5/1997 Jain et al. ............. 370/234
6,570,846 B1 * 5/2003 Ryoo ..................... 370/229
6,732,190 B1 * 5/2004 Williams et al. ........ 709/250
6,795,450 B1 * 9/2004 Mills et al. ............. 370/463
2005/0177755 A1 * 8/2005 Fung ..................... 713/300

* cited by examiner

*Primary Examiner*—Frantz B. Jean
(74) *Attorney, Agent, or Firm*—Rosenberg, Klein & Lee

(57) ABSTRACT

The present invention discloses a method and an apparatus for reducing power consumption in a network linking system. The apparatus comprises: a network linking interface device, including a media access controller (MAC), a gigabit physical layer (gigabit PHY), and a connector, through which the network linking interface device is coupled to an Ethernet by a network cable; a driving device, for driving and controlling the network linking interface device; and a load monitoring module, for monitoring the load for the network interface device so as to adjust the link speed according to the load. The method comprises steps of: determining the network linking interface device to be in an autonegotiation mode; performing autonegotiation; obtaining settings of a remote-end network linking interface device; linking at the highest usable link speed; enabling the load monitoring module; adjusting the settings of the network linking interface device according to the load of the network linking interface device; and performing autonegotiation again and linking at a proper link speed.

19 Claims, 6 Drawing Sheets

|  | Linking ability of 1Gbps | | Linking ability of 100Mbps | | Linking ability of 10Mbps | | Re-Auto Negotiation | |
|---|---|---|---|---|---|---|---|---|
| value | 0 | 1 | 0 | 1 | 0 | 1 | 0 | 1 |
| action | disable | enable | disable | enable | disable | enable | N/A | trigger |

FIG. 4

METHOD AND APPARATUS FOR REDUCING POWER CONSUMPTION IN NETWORK LINKING SYSTEM

BACKGROUND OF THE INVENTION

1. Field of the Invention

The present invention generally relates to a method and a network apparatus and, more particularly, to a method and an apparatus for reducing power consumption in a network linking system. The apparatus comprises a network linking interface device, a driving device and a load monitoring module such that the load of the network can be monitored, the average load of the network within a predetermined time interval can be evaluated, the network parameters can be adjusted according to the average load, and thus the network link speed can be re-negotiated properly.

2. Description of the Prior Art

In recent years, with the high development in information-related industries, people have increasing needs for a higher operation speed as well as a higher data transmission rate on the network. In view of this, the industries have made lots of efforts to improve the data transmission rate on the network. For example, the early Ethernet providing a transmission link speed of 10 Mbps (mega bits per second) has been improved as the modern-day enhanced Ethernet providing a transmission link speed of 100 Mbps or even up to 1000 Mbps, i.e., 1 Gbps (giga bits per second).

To operate in coordination with the upgraded transmission rate of the network as well as the compatibility between the product specifications, some manufacturers have proposed various solutions. Please refer to, for example, FIG. 1, which is a block diagram schematically illustrating the configuration of a conventional network interface card (NIC). In FIG. 1, a computer 10 to be linked to the network comprises a network interface card 12, which includes: a media access controller (MAC) 121; an oscillator 125; a gigabit physical layer (gigabit PHY) 123; and a connector 127, through which the computer 10 can be linked to the Ethernet 14 by a network cable. The gigabit physical layer 123 provides linking for three different link speeds, including 10 Mbps, 100 Mbps and 1 Gbps, and performs data transmission on the network at a proper link speed according to the information and settings by negotiating with a remote-end network interface card.

When the network interface card 12 operates at a link speed of 1 Gbps, the gigabit physical layer 123 utilizes a phase-locked loop to multiply a 25-MHz clock signal from the oscillator 125 to be 125-MHz to serve as a system clock in the physical layer. In other words, all the operation modules in the physical layer operate at 125 MHz. On the other hand, if the selected link speed is 100 Mbps, the operation modules in the physical layer operates utilizes the 25-MHz clock signal provide by the oscillator 125 to operate at 25 MHz. Furthermore, when the network interface card 12 operates at a link speed of 10 MHz, the system clock in the physical layer is 2.5 MHz and the operation modules in the physical layer operate at 2.5 MHz. Therefore, the power consumption may varies according to the different operation clocks due to the three different link speeds. Based on the experimental results, the power consumption ratio indicating the comparison among different link speeds including 10 Mbps, 100 Mbps and 1 Gbps is 1:1.2:3. Evidently, the power consumption of linking at 1 Gbps is much larger than the other two cases.

For conventional network linking, after the network interface card is linked at a certain link speed, the fixed link speed is utilized until the linking is terminated. However, the data flow rate is not steady and the load may vary. It wastes of power when the network operates at a higher link speed under low data load.

Therefore, there is a need for reducing power consumption in network linking systems.

SUMMARY OF THE INVENTION

Accordingly, it is the primary object of the present invention to provide an apparatus for reducing power consumption in a network linking system, in which a load monitoring module is installed such that the load of the network can be monitored, the link speed can be re-negotiated to a proper one, and thus the power consumption in the system can be reduced.

It is a secondary object of the present invention to provide a method for reducing power consumption in a network linking system, in which the linking link speed can be dynamically switched by adjusting the settings of the network linking interface device and taking a re-negotiation, such that the power consumption in the network system can be reduced.

It is another object of the present invention to provide a method for reducing power consumption in a network linking system, in which the settings of a network linking interface device are modified such that the network performs at a lower link speed to reduce power consumption when the average load of the network within a predetermined time interval is lower than a predetermined value.

It is still another object of the present invention to provide a method for reducing power consumption in a network linking system, in which the settings of a network linking interface device are modified such that the network performs at a higher link speed to maintain the transmission rate of the network when the average load of the network within a predetermined time interval is higher than a predetermined value.

In order to achieve the foregoing objects, the present invention provides an apparatus for reducing power consumption in a network linking system, comprising: a network linking interface device, including a media access controller (MAC), a gigabit physical layer (gigabit PHY), and a connector, through which the network linking interface device is linked to an Ethernet by a network cable; a driving device, for driving and controlling the network linking interface device; and a load monitoring module, for monitoring the load of a network so as to adjust the link speed according to the load.

The present invention further provides a method for reducing power consumption in a network linking system, wherein the network linking system comprises a network linking interface device and a load monitoring module for supporting a plurality of link speeds, and the method comprises steps of: determining the network linking interface device to be in an autonegotiation mode; performing autonegotiation; obtaining settings of a remote-end network linking interface device; linking at the highest link speed; enabling the load monitoring module; adjusting the settings of the network linking interface device according to the load of the network linking interface device; and performing autonegotiation again and linking at a proper link speed.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiment of the present invention will be readily understood by the accompanying drawings and detailed descriptions, wherein:

FIG. 4 is a table of part of the physical layer register showing the relation between the values and the corresponding actions in accordance with the present invention;

DETAILED DESCRIPTION OF THE INVENTION

The present invention providing a method and an apparatus for reducing power consumption in a network linking system can be exemplified by the preferred embodiments as described hereinafter.

Figure 1:
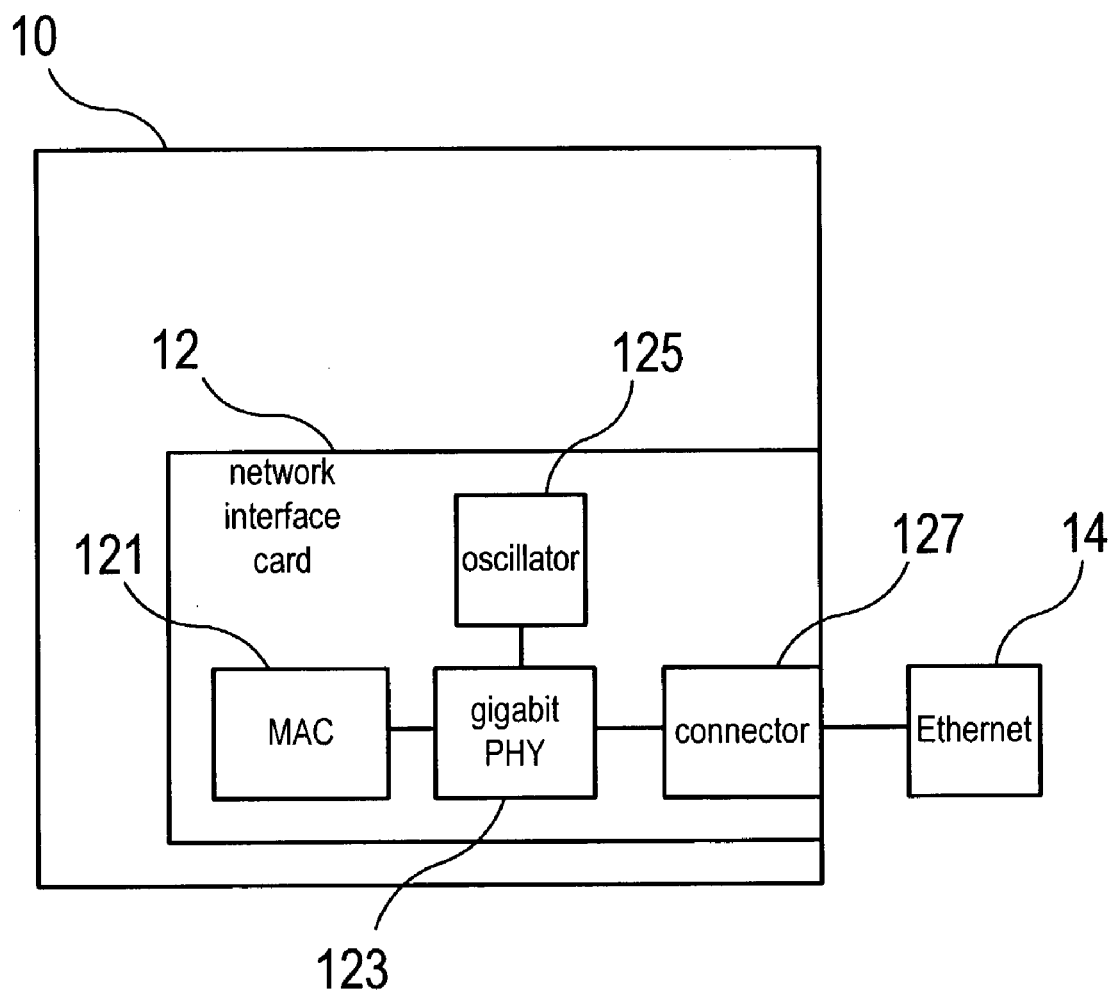
FIG. 1 is a block diagram schematically illustrating the configuration of a network interface card (NIC) in accordance with the prior art.
Figure 2:
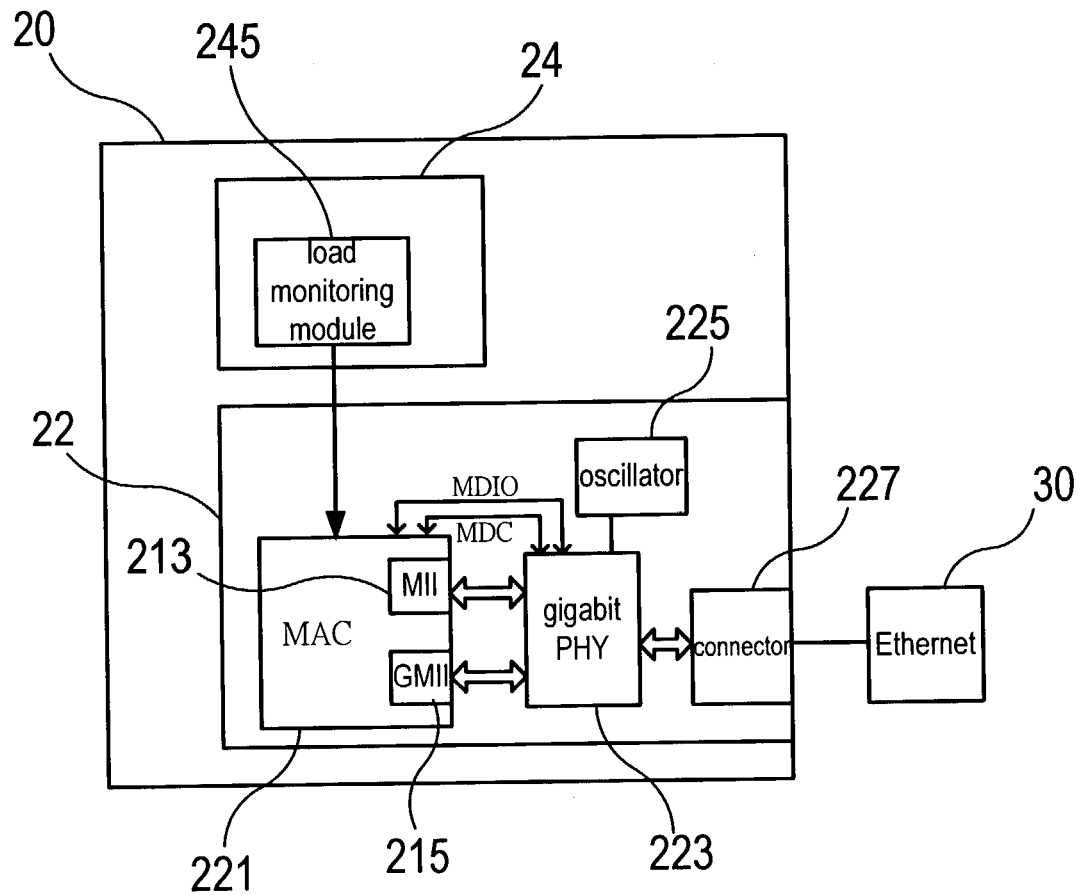
FIG. 2 is a block diagram in accordance with one preferred embodiment of the present invention.

Please refer to FIG. 2, which is a block diagram in accordance with one preferred embodiment of the present invention. As shown in the figure, the network linking system according to the present invention comprises: a network linking interface device 22 for connecting a system 20 to the Ethernet 30 by a network cable; and a driving device 24 for driving and controlling the network linking interface device 22. The network linking interface device 22 includes a media access controller (MAC) 221, a gigabit physical layer (gigabit PHY) 223, an oscillator 225, and a connector 227, through which the computer 20 can be linked to the Ethernet 30 by a network cable.

The gigabit physical layer 223 is coupled to the connector 227 to tranceive data on the network cable at various link speeds such as 10 Mbps, 100 Mbps and 1 Gbps. The gigabit physical layer 223 utilizes the oscillator 225 to cooperate with a phase-locked loop (not shown) embedded in the physical layer to generate the clock signal for various link speeds. The media access controller 221 performs functions such as logical topology, media access and addressing. When linking at 10 Mbps or 100 Mbps, a media independent interface (MII) 213 is used for data transmission between the MAC 221 and the gigabit PHY 223. When linking at 1 Gbps, a gigabit media independent interface (GMII) 215 is used for data transmission between the MAC 221 and the gigabit PHY 223. The media access controller 221 further comprises a PHY control module (not shown), which is connected to the gigabit physical layer 223 by a management interface clock (MDC) signal line and a management interface data I/O (MDIO) signal line so as to access the status and settings of the register (not shown) in the gigabit physical layer 223.

The driving device 24 comprises a load monitoring module 245 for reading the counts and sizes of the data packets in the management information base counters (MIB counters) in the media access controller 221 so as to evaluate and monitor the data flow of the network and to adjust the link speed according to the load of the network.

In the preferred embodiment, the network linking interface device 22 is implemented by using a network interface card as an interface for the computer 20 to be connected to the network. The driving device 24 is implemented by using a driving program, which contains a load monitoring module to read the total quantity of the tranceived data in the MIB counters to evaluate the load of the network by using a hardware timer or a software timer.

The present invention may also be used in a network switch. In this case, the driving device 24 is a microprocessor and the load monitoring module is implemented by firmware.

Figure 3:
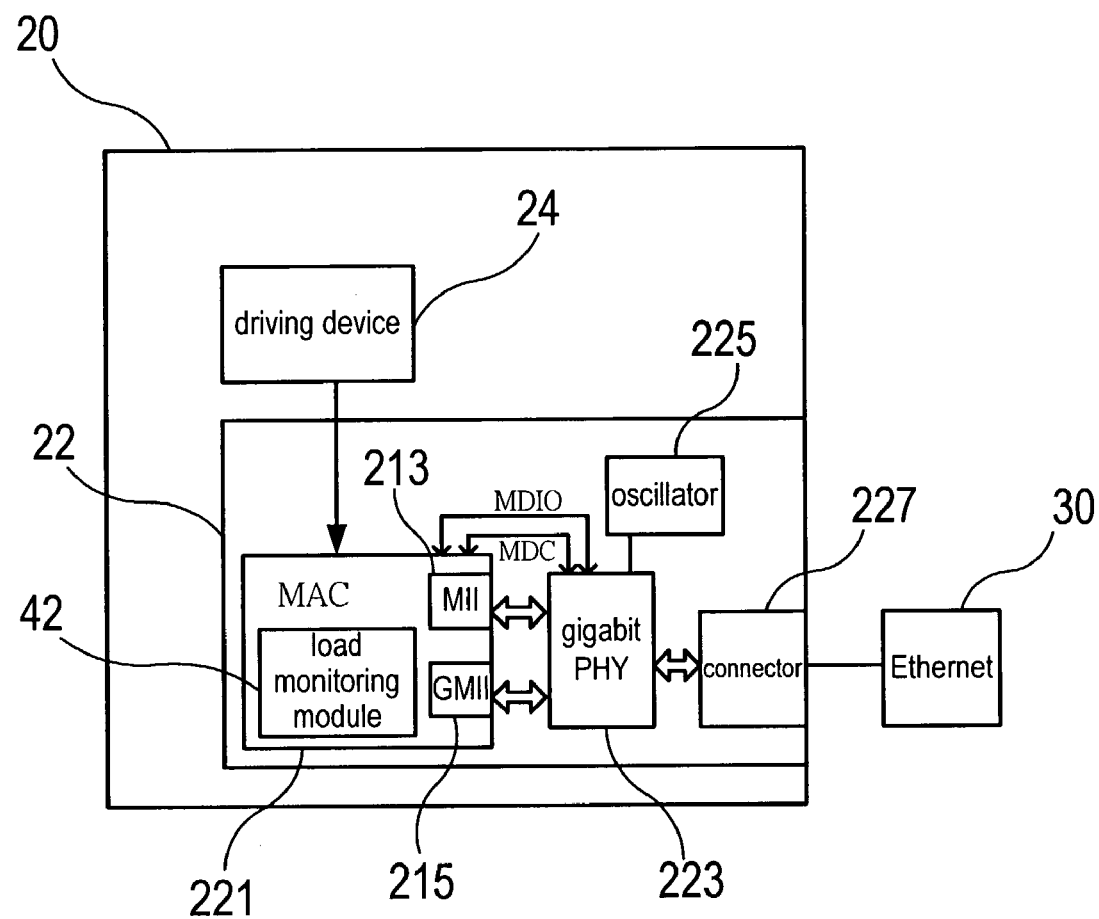
FIG. 3 is a block diagram in accordance with another preferred embodiment of the present invention.

On the other hand, please refer to FIG. 3, which is a block diagram in accordance with one preferred embodiment of the present invention. As shown in the figure, the load monitoring module 42 is implemented by hardware in the media access controller 221 to access the counts and sizes of the data packets in the MIB counters so as to evaluate the load of the network by using a timer (not shown).

Furthermore, in FIG. 4, which is a table of part of the physical layer register showing the relation between the values and the corresponding actions in accordance with the present invention. The register in the physical layer includes the data of the status as well as the settings of the physical layer. In the table, there are four columns for linking ability of 1 Gbps, linking ability of 100 Mbps, linking ability of 10 Mbps, and re-autonegotiation. The value for each column can be 0 or 1. The value 0 represents "disable", which means that the corresponding link speed is disabled. On the contrary, the value 1 indicates "enable", which means that the corresponding link speed is enabled. In addition, the value 0 for re-autonegotiation represents that no corresponding action will happen, and the value 1 for re-autonegotiation represents that the hardware will be triggered to perform autonegotiation.

Figure 5:
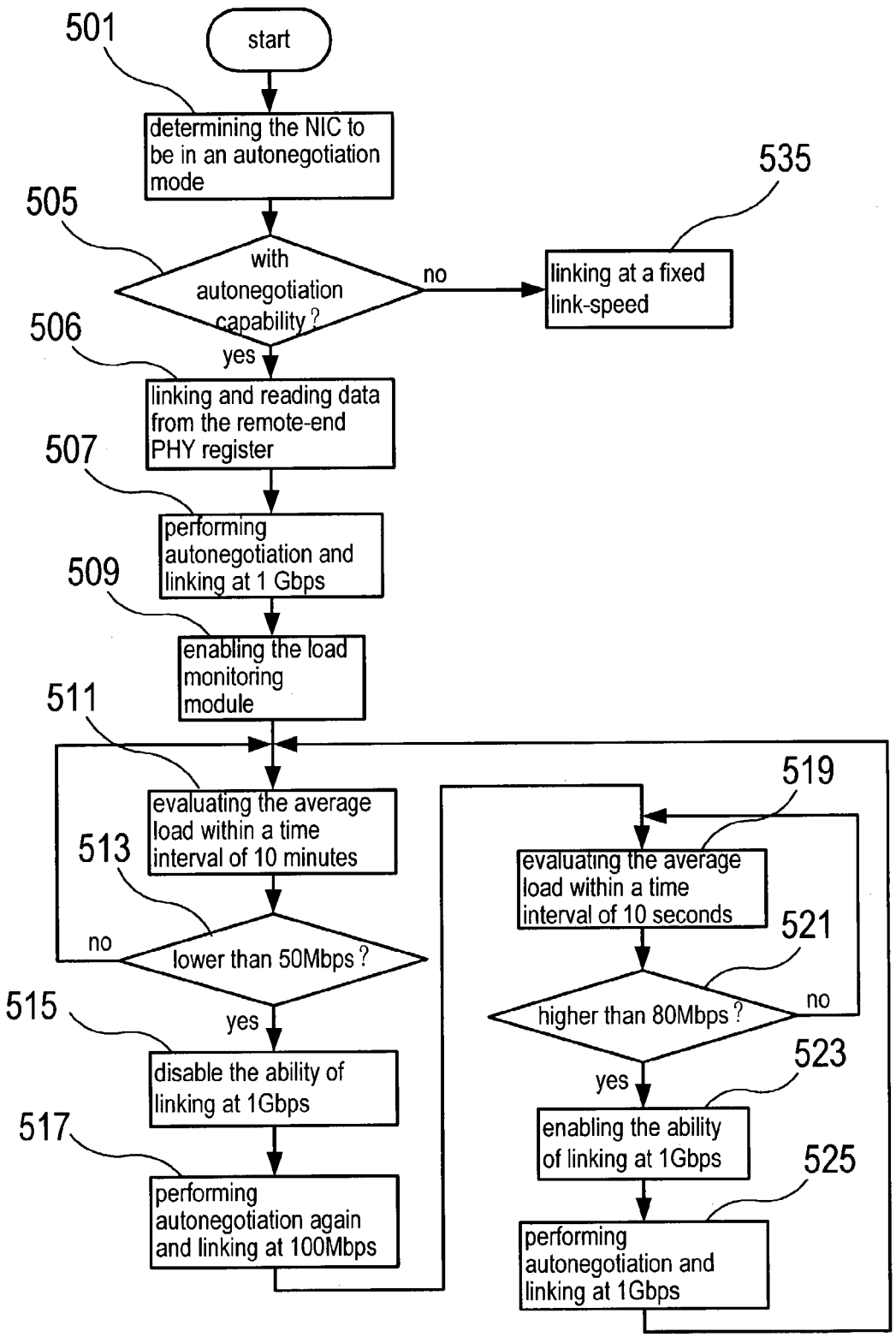
FIG. 5 is a flow chart illustrating a method in accordance with the present invention.

Please refer to FIG. 5, which is a flow chart illustrating a method in accordance with the present invention. Let us take a network interface card for example. To start with, the network interface card of the present invention is determined to be in an autonegotiation mode 501. When the network interface card of the present invention is connected to a remote-end network interface card, it is determined whether the remote-end network interface card is provided with autonegotiation capability 505. For example, the determination is made by detecting whether the remote-end network interface card delivers a normal link pulse or a fast link pulse at the beginning, and the special information carried. If a force mode is determined, the network will be forced to link at a fixed link speed 535.

If the far-end network interface card is provided with autonegotiation capability, the network interface card of the present invention acquires the capability for the physical layer of the remote-end network interface card 506. In the preferred embodiment, if the remote-end network interface card supports linking modes of 10 Mbps, 100 Mbps and 1 Gbps, both ends can link to each other at 1 Gbps after negotiation 507. After linking, the load monitoring module is enabled to perform monitoring of network flow 509, evaluate the average load within a time interval (for example, 10 minutes) 511, and determine if the average load is lower than 50 Mbps, which is a downward switching threshold corresponding to the linking mode of 100 Mbps 513. If the average load is higher than 50 Mbps, the linking continues and the monitoring of network flow goes on. If the average load is lower than 50 Mbps, however, the linking ability of 1 Gbps will be disabled by filling the corresponding bit of the register with 0 515.

Then, during a time interval without data transmission between both ends, the associated re-autonegotiation bit is set as 1 such that autonegotiation is performed again and both ends can link to each other at 100 Mbps since only the link speeds at 100 Mbps and 10 Mbps are allowed 517. After linking, the associated re-autonegotiation bit should be reset as 0. Since the link speed is reduced, a shorter time interval (for example, 10 seconds) is employed to evaluate the average load 519. Then, it is determined whether the average load is higher than 80 Mbps, which is a upward switching threshold corresponding to 1 Gbps 521. If the average load is lower than 80 Mbps, the linking continues at a constant link speed. If the average load is higher than 80 Mbps, however, the linking ability of 1 Gbps will be enabled by setting the value of the corresponding bit in the register as 1 523. Then, autonegotiation is performed again and both ends can link to each other at 1 Gbps again 525. The monitoring of network flow goes on and the link speed is adjusted according to the load.

As stated above, the time interval as well as the upward/downward switching point can be predetermined by the user. The time interval for determining whether the link speed should be increased is smaller such that the network system may respond to a requirement for increasing link speed rapidly when the load of the network increases. On the contrary, the time interval for determining whether the link speed should be decreased is larger such that the network system can provide an efficient data transmission.

Furthermore, the method according to the present invention may be applicable to the case where more than three link speeds are supported. For the case where three link speeds are supported, the method according to the present invention reduces the power consumption without affecting the data transmission rate such that the power consumption is reduced. For possible higher link speeds in the future, however, a plurality of the upward/downward switching points can be predetermined according to the practical use.

When the link speed is to be decreased, an average load evaluated within a larger time interval is used as a reference so as to compare with each of the downward switching thresholds. The link speed corresponding to the lowest one of the downward switching thresholds which are higher than the average load is selected as a determined link speed. If the determined link speed is equal to the current link speed, no adjustment is required. If the determined link speed is lower than the current link speed, however, the settings of the network interface card should be modified so that the link speed(s) higher than the determined link speed is disabled. Then, autonegotiation is performed again and the system links at the determined link speed.

When the link speed is to be increased, an average load evaluated within a smaller time interval is used as a reference so as to compare with each of the upward switching thresholds. The link speed corresponding to the highest one of upward switching thresholds which are lower than the average load is selected as a determined link speed. If the determined link speed is equal to the current link speed, no adjustment is required. If the determined link speed is higher than the current link speed, however, the settings of the network interface card should be modified so that the determined link speeds is enabled and the link speed higher than the determined link speed is disabled. Then, autonegotiation is performed again and the system links at the determined link speed. In this way, the link speed may be easily changed in accordance with the data flow on the network without deteriorating the data throughput such that the power consumption can be reduced.

Figure 6:
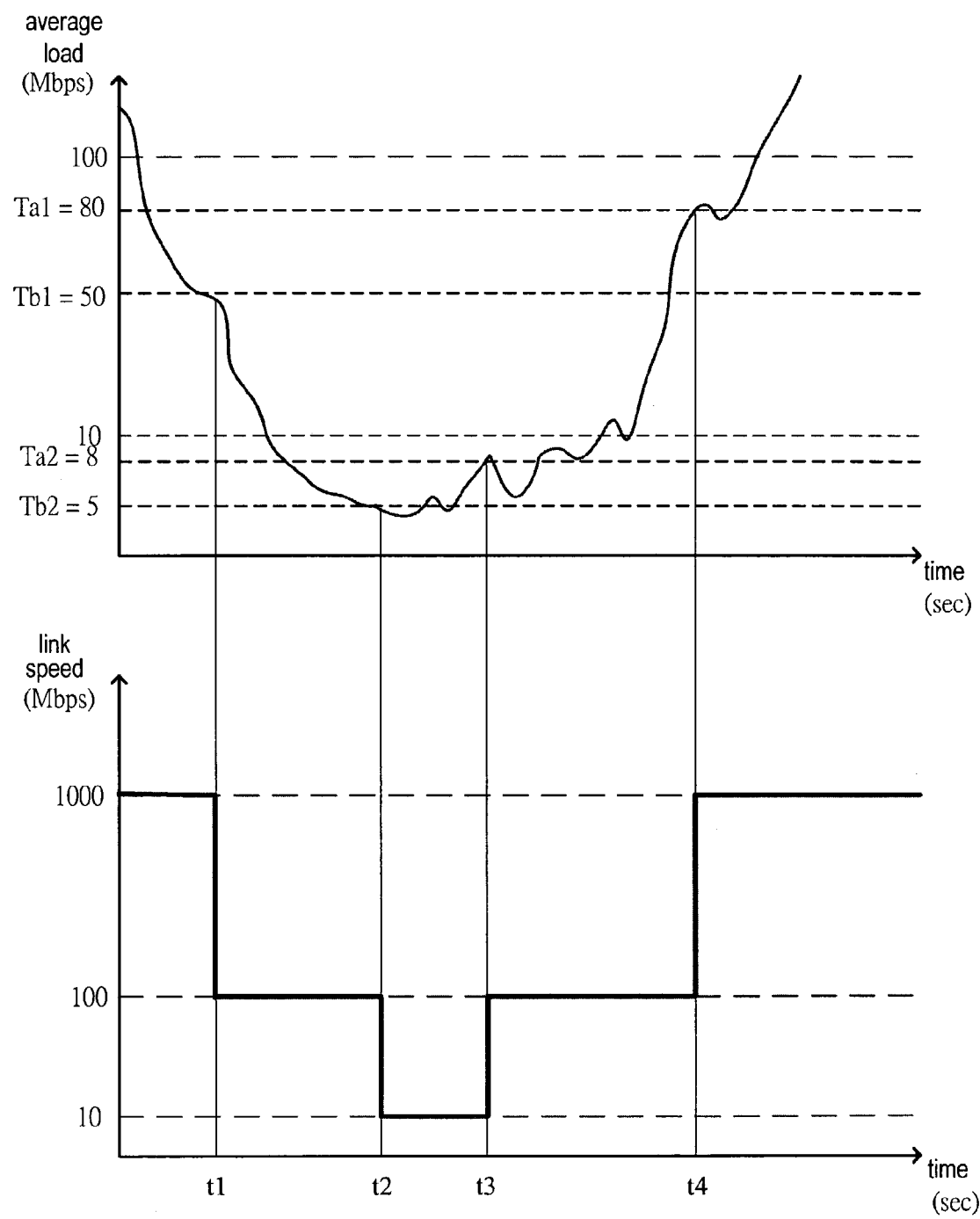
FIG. 6 shows the relation between the average load and the link speed in accordance with another preferred embodiment of the present invention.

Finally, please refer to FIG. 6, which shows the relation between the average load and the link speed in accordance with the preferred embodiment of the present invention. In the figure, the first time interval is 10 minutes and the second time interval is 10 seconds. The downward switching threshold $Tb1$ corresponding to 100 Mbps is 50 Mbps and the upward switching threshold $Tb2$ corresponding to 100 Mbps is 8 Mbps. Furthermore, the upward switching threshold $Ta1$ corresponding to 1 Gbps is 80 Mbps and the downward switching point $Tb2$ corresponding to 10 Mbps is 5 Mbps.

In FIG. 6, the vertical axis represents the average load per unit time. As shown in the figure, the average load decreases with time. At $t1$, the average load within 10 minutes is lower than the downward switching threshold $Tb1$; therefore, the link speed is lowered to 100 Mbps. As the average load continues decreasing, the average load within 10 minutes is lower than the downward switching threshold $Tb2$ at $t2$; therefore, the link speed is further lowered to 10 Mbps. Then, the average load increases with time. At $t3$, the average load within 10 seconds is higher than the upward switching threshold $Ta2$; therefore, the link speed is increased to 100 Mbps. At $t4$, the average load within 10 seconds is higher than the upward switching threshold $Ta1$; therefore, the link speed is encreased to 1 Gbps. In this way, the link speed is dynamically adjusted by monitoring the load of the network without deteriorating transmission efficiency while the power consumption is reduced.

According to the above discussion, it is apparent that the present invention discloses a method and an apparatus for reducing power consumption in a network linking system. The apparatus comprises a network linking interface device, a driving device and a load monitoring module such that the load of the network can be monitored, the average load of the network within a predetermined time interval can be evaluated, the network parameters can be adjusted according to the average load, and thus the link speed can be re-autonegotiated properly. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only by the scope of the appended claims.

What is claimed is:

1. An apparatus for reducing power consumption in a network linking system, comprising:

a network linking interface device for supporting at least a first link speed and a second link speed, said first link speed exceeding said second link speed, said network linking interface device including a media access controller (MAC), a gigabit physical layer (gigabit PHY), and a connector coupling said network linking interface device to an Ethernet by a network cable;

a driving device driving and controlling said network linking interface device; and a load monitoring module monitoring a network load for the interface device at least within a first time interval and at least within a second time interval to adjust a link speed for the interface device according to the load;

said driving device disabling the linking ability of said network linking interface device at said at least first link speed, when the monitored network load within the first time interval is lower than a first downward switching threshold corresponding to said at least second link speed; and disabling the linking ability of said network linking interface device at said at least second link speed, when the monitored network load within the second time interval is higher than a first upward switching threshold corresponding to said at least first link speed.

2. The apparatus as claimed in claim 1, wherein said driving device is implemented by using a driving program.

3. The apparatus as claimed in claim 2, wherein said load monitoring module is implemented by a monitoring program which is a module of said driving program.

4. The apparatus as claimed in claim 1, wherein said load monitoring module is installed in said media access controller.

5. The apparatus as claimed in claim 1, wherein said network linking interface device is a network interface card.

6. The apparatus as claimed in claim 1, wherein said driving device is a microprocessor.

7. The apparatus as claimed in claim 1, which is suitable for use in alternative of a computer and a network switch.

8. A method for reducing power consumption in a network linking system, wherein said network linking system comprises a network linking interface device for supporting a plurality of link speeds and a load monitoring module, and said method comprises steps of:
   actuating said network linking interface device as in an autonegotiation mode;
   performing autonegotiation;
   acquiring capability settings for a remote-end network linking interface device;
   linking at a maximum link speed;
   enabling said load monitoring module;
   adjusting a plurality of capability settings of said network linking interface device according to a network load of said network linking interface device; and
   performing autonegotiation and linking at a proper link speed based on the adjusted capability settings, wherein said plurality of link speeds includes decreasingly at least a first link speed and at least a second link speed, said step of linking at a proper link speed comprising the steps of:
   providing a first time interval and a first downward switching threshold corresponding to said second link speed;
   disabling the linking ability of said first link speed when the average load of said network linking interface device within said first time interval is lower than said first downward switching threshold; and
   re-auto-negotiating with said remote-end network linking interface device to link at said second link speed.

9. The method as claimed in claim 8, wherein said first time interval and said first downward switching threshold are predetermined by a user.

10. The method as claimed in claim 8, further comprising steps of:
   providing a second time interval and a first upward switching threshold corresponding to said first link speed;
   enabling the linking ability of said first link speed when the average load of said network linking interface device within said second time interval is higher than said first upward switching threshold; and
   re-auto-negotiating with said remote-end network linking interface device to link at said first link speed.

11. The method as claimed in claim 10, wherein said second time interval and said first upward switching threshold are predetermined by a user.

12. The method as claimed in claim 10, wherein said second time interval is smaller than said first time interval.

13. The method as claimed in claim 8, wherein said link speeds further include at least a third link speed, said third link speed being lower than either of said first and second link speeds, said step of linking at a proper link speed further comprising the steps of:
   providing a second downward switching threshold corresponding to said third link speed;
   evaluating the average load of said network linking interface device within said first time interval;
   adjusting settings of said network linking interface device to disable the linking ability of said first link speed when the average load of said network linking interface device within said first time interval is between said first downward switching threshold and said second downward switching threshold;
   adjusting settings of said network linking interface device to disable the linking ability of said first link speed and said second link speed when the average load of said network linking interface device within said first time interval is smaller than said second downward switching threshold; and
   re-auto-negotiating with said remote-end network linking interface device and linking at a largest un-disabled link speed.

14. A network device capable of reducing power consumption, comprising:
   a media access controller (MAC); and
   a physical layer device, coupled to said media access controller and having a plurality of link speeds including at least a first link speed and at least a second link speed, said at least first link speed exceeding said at least second link speed; wherein
   said network device switches among said link speeds according to a load for said network device;
   wherein the linking ability of said network device at said at least first link speed is disabled when the monitored load within a first time interval is lower than a downward switching threshold corresponding to said at least second link speed; and
   wherein the linking ability of said network device of said at least second link speed is disabled when the monitored load within a second time interval is higher than an upward switching threshold corresponding to said at least first link speed.

15. The network device as claimed in claim 14, wherein said load is the count of bits transmitted by said network device per unit time.

16. The network device as claimed in claim 14, wherein said media access controller comprises a plurality of management information base counters (MIB counters).

17. The network device as claimed in claim 16, wherein said media access controller comprises a timer for counting a determined time interval.

18. The network device as claimed in claim 17, wherein said media access controller evaluates said load in response to said timer and said MIB counters.

19. The network device as claimed in claim 14, wherein said physical layer device comprises: a plurality of speed registers for determining said corresponding link speeds and a re-autonegotiation register for actuating re-autonegotiation.

* * * * *